April 7, 1964 R. Z. PAGE 3,128,239
BIOLOGICAL DETECTION EQUIPMENT
Filed June 29, 1962
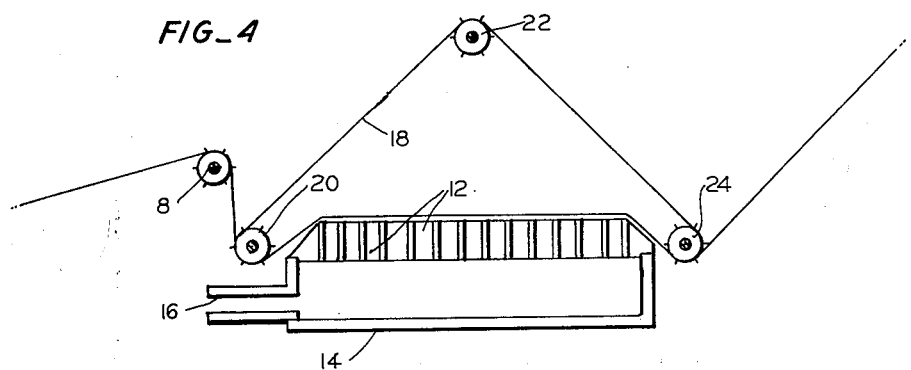
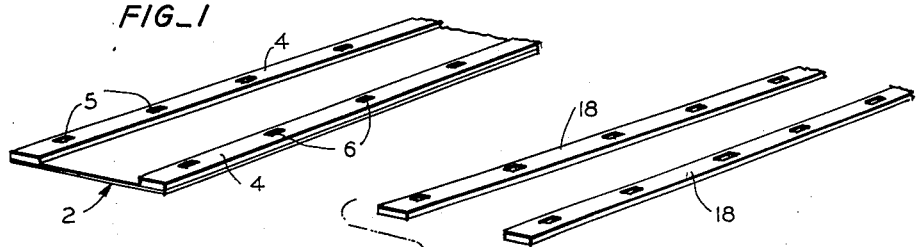
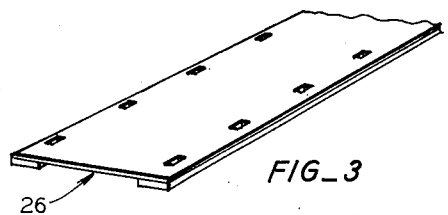
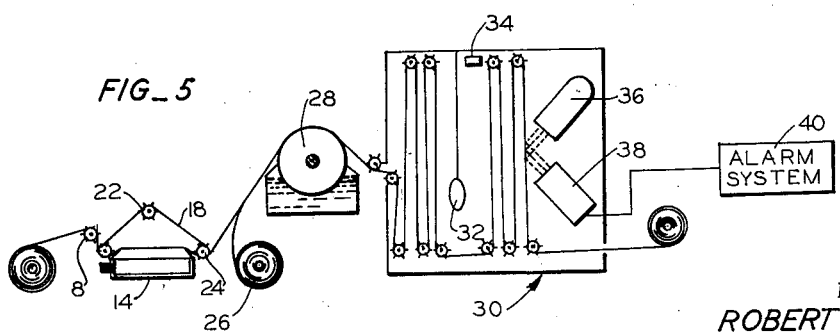
INVENTOR.
ROBERT Z. PAGE
BY
ATTORNEY

3,128,239
BIOLOGICAL DETECTION EQUIPMENT
Robert Z. Page, 7117 Kerr Drive, Springfield, Va.
Filed June 29, 1962, Ser. No. 206,524
5 Claims. (Cl. 195—127)
(Granted under Title 35, U.S. Code (1952), sec. 266)

The invention described herein may be manufactured and used by or for the Government of the United States of America for governmental purposes without the payment of any royalties thereon or therefor.

This invention relates to sampling equipment and more particularly to equipment which will automatically and continuously sample air (or water), which will automatically detect and identify biological warfare agents or other pathogenic organisms present in the fluid sampled, which will automatically determine the resistance of such pathogens to antibiotics, and which will activate an alarm system.

Old prior art devices for detecting and identifying pathogenic organisms involve typically the passage of air over culture plates or through nutrient solutions. The process involved was necessarily relatively slow. The more recent development of the millipore filter has permitted much more rapid reading of results. However, the millipore filter and nutrient pad associated with it are made in the prior art as disks which must be manually replaced after a period of exposure and then placed in a culture chamber for the period of development. The results must then be read by a well-trained technician. "Early" reading requires the use of a microscope. Subculturing is required for determination of resistance to antibiotics. Answers to subculturing would not be available until after many human deaths could have occurred following exposure to pathogens. The chances for both negligence and human error in these prior art techniques are great. Requirements for trained mechanisms preclude wide use of this prior art system as an effective warning procedure.

An object of the present invention is to provide apparatus which will sample a fluid and which will automatically detect and identify biological warfare agents or other pathogenic organisms in the fluid and which will automatically activate an alarm system upon identification of particular organisms.

Another object of the invention is to provide an apparatus which will automatically sample a fluid and will automatically detect and identify biological warfare agents or other pathogenic organisms present in the fluid and will automatically determine the resistance of such pathogens to antibiotics.

Other objects and many of the attendant advantages of this invention will be readily appreciated as the same becomes better understood by reference to the following detailed description when considered in connection with the accompanying drawings wherein:

FIG. 1 is a generally diagrammatic axonometric view of a piece of filter tape used in the invention;

FIG. 2 is a generally diagrammatic view similar to FIG. 1 of portions of a pair of driving guide tapes used in conjunction with the filter tape of FIG. 1;

FIG. 3 is a generally diagrammatic view similar to FIG. 1 of a piece of absorbent tape used with the filter tape of FIG. 1;

FIG. 4 is a schematic view of a portion of one preferred embodiment of the invention including a vacuum entrapment chamber for use with the filter tape of FIG. 1; and FIG. 5 is a schematic view of one preferred embodiment of the equipment of the invention.

The operation of the apparatus of this invention is based upon the use of a filter developed in recent years and known as the molecular filter (described by Goetz, the patentee of pertinent U.S. Patents 2,761,813, 2,672,-432 and 2,672,431), the membrane filter (described by Clark), and the millipore filter (manufactured by the Lovell Chemical Company, assignee of pertinent Patent 2,677,646). The porosity of the filters is such that bacteria and other microorganisms are entrapped on the upper surface of the filters. The millipore filter is available as an aerosol assay type for use with air or other gases and the hydrosol assay type for use with liquids. In some forms these filters are used with an absorbent pad which has previously been impregnated with nutrients. The absorbent pads can also be treated with dyes and dye activators which aid in the early definitive chromatic detection and identification of the pathogens. The moistening of the absorbent pad with water permits the moistening of the filter and entrapped organisms with solutions of the materials contained in the pads. In the prior art these filters and the absorbent pads are normally provided as disks which fit specially designed filtering equipment. After filtration, the filters are placed on the moistened absorbent pads and held at elevated temperatures for incubation. The pathogens present are identified by the color of the small colonies developing during incubation.

According to this invention apparatus is provided which by fabricating the filters and absorbent pads of the prior art in the form of tape, insures continuous and automatic sampling and culturing, with determination of resistance to antibiotics, and with an automatic warning device so that information is provided by the time the first clinical symptoms begin to appear in populations subject to attack. A trained technician is needed for only a few minutes every few days to check operation and replace filter and absorbent tapes.

Reference is now made to the drawings. The molecular (or membrane or millipore) filter used in the invention is in the form of rolls of sterile tape. The tape 2 (FIG. 1) is reinforced as at 4 by any suitable means such as strips of plastic or strong paper. The tape is perforated as shown at 6 near the edges to permit handling by sprockets 8, 10, etc. The filter tape is passed over a perforated surface 12 of glazed enamel, the underside of which forms the top of a chamber 14 connected as at 16 to a vacuum pump. In passage over the perforated enamel surface, the filter tape 2 is held securely by perforated driving guide tapes 18, typically of steel, driven and held by sprocket wheels 20, 22, 24.

A treated absorbent tape 26 is moved to a position directly beneath the filter tape 2 after the filter tape leaves the perforated surface 12. The absorbent tape is treated either with a "universal" nutrient or serially with several nutrients. Antibiotics can be added to the series to provide further information indicating the resistance of microorganisms to various antibiotics. The two tapes are moved together over a moistening unit such as a sponge cylinder 28. From the moistening unit the two tapes are moved together into an incubation chamber 30 of high humidity. The elevated temperature in the chamber is maintained by a heating unit 32 and thermostat 34. From the incubation chamber, the tapes are moved past a light source 36 with optical filters and photoelectric pickup means 38 with optical filters. The use of filters permits activation of the photoelectric cells by a predetermined segment of the spectrum. The output of the photoelectric pickup is fed to an alarm system 40 and, if desired, to a recording device for recording the data and which can be embodied, if desired, in the alarm system.

Details of such items as motors and mechanical drives for driving the sprockets, vacuum pumps, recording devices, alarm systems and the like, are not shown since they are readily available to those skilled in the art and do not constitute a part of this invention. The choice of alarm systems is, for example, rather obvious and may include such warning devices as flashing lights, ringing bells, etc., set off by receipt by the photoelectric means of predetermined wavelengths of light. Similarly the details of the optical filters and photoelectric pickup means are not shown for the same reason. Many various designs are available to those skilled in the art and their details will vary according to the chromatic pictures produced upon the filter. This factor in turn is determined by the organisms cultured and by the media, dyes, and dye activators used.

Many modifications of this apparatus are possible within the concept of the invention. For example, the absorbent tape can be a single layer tape in the form of a single strip. However, multiple layers and, particularly, parallel strips can be used and under certain monitoring conditions prove highly advantageous. The illumination and detection, as illustrated, involve reflected light. Transmitted light can be used and in such a case the two tapes are separated after incubation and the filter tape is treated with clear mineral oil. To preserve the microorganisms for a detailed later study, the tape after passing through the illustrated culture chamber can be passed for temporary "filing" of the pathogens and for enlargement of the colonies into a second culture chamber.

Obviously many other modifications and variations of the present invention are possible in the light of the above teachings. It is therefore to be understood that within the scope of the appended claims the invention may be practiced otherwise than as specifically described.

What is claimed is:

1. Apparatus comprising filter tape made of material capable of filtering out from a suspending fluid medium and retaining microorganisms; a vacuum chamber having perforated wall and means for subjecting said chamber to vacuum; means for moving said filter tape continuously past said wall in intimate contact with the exterior surface of said wall whereby, when a vacuum is applied to said vacuum chamber, the fluid medium surrounding said chamber is caused to flow through said filter tape to deposit microorganisms from said medium on said filter tape; means for bringing absorbent tape into intimate contact with said filter tape after said filter tape has passed said chamber; means for causing said absorbent tape and said filter tape, while remaining in intimate contact, to move together continuously to a moistening unit for moistening absorbent tape to produce therein a plurality of moist regions, each containing, for supply to said filter tape, nutrient, dye, and dye activator for a particular microorganism, there being separate regions adapted to culture different microorganisms; an incubation chamber; means for feeding said tapes into said incubation chamber, the rate of travel of the tapes being such that they remain in said incubation chamber for an incubation period long enough to develop observable colonies of microorganisms; a light source to produce light to illuminate microorganism colonies which produce characteristic colors in the presence of their assoicated dyes and dye activators; means for passing said tapes after said incubation period into the path of light from said light source; photoelectric pickup means which respond to selected wavelengths of light characteristic of particular microorganisms, located to reecive light from said light source after impingement on said tapes; optical filter means associated with said light source and photoelectric pickup means to facilitate transmission to said photoelectric pickup means of selected wavelengths of light characteristic of particular microorganism; and an alarm system connected to said photoelectric pickup means to signal an alarm upon receipt from said photoelectric pickup means, of a signal indicative of light characteristic of a particular microorganism.

2. The apparatus of claim 1 wherein said filter tape is provided with reinforcing strips along its edges and sprocket perforations formed in the reinforced edges; and wherein said absorbent tape is perforated; said apparatus including sprockets to engage the perforations in said tapes as the means to cause motion of said tapes.

3. The apparatus of claim 1 wherein said absorbent tape is provided with dry impregnations of nutrients for culturing particular microorganisms and of dyes and dye activators specific to particular microorganisms and wherein said means for bringing into contact with each other said filter tape and said absorbent tape accomplishes its function while said absorbent tape is dry, the moisture from said moistening unit thereafter activating said impregnations while said tapes remain in contact with each other.

4. The apparatus of claim 1 wherein the means for moving said filter tape in intimate contact with the exterior surface of a wall of said vacuum chamber includes perforated metal tapes traveling with said filter tape and pressing said filter tape toward said exterior surface.

5. The apparatus of claim 1 further including means for supplying to at least some of said separate regions antibiotics to determine the resistance to antibiotics of microorganisms on said filter tape.

References Cited in the file of this patent

UNITED STATES PATENTS

| | | |
|---|---|---|
| 2,247,460 | Wright | July 1, 1941 |
| 2,761,813 | Goetz | Sept. 4, 1956 |
| 3,014,848 | Ferrari | Dec. 26, 1961 |

UNITED STATES PATENT OFFICE
CERTIFICATE OF CORRECTION

Patent No. 3,128,239                          April 7, 1964

Robert Z. Page

It is hereby certified that error appears in the above numbered patent requiring correction and that the said Letters Patent should read as corrected below.

Column 1, line 37, for "mechanisms" read -- technicians --.

Signed and sealed this 8th day of September 1964.

(SEAL)
Attest:

ERNEST W. SWIDER
Attesting Officer

EDWARD J. BRENNER
Commissioner of Patents